Aug. 11, 1970 M. BEAUVAIS 3,523,460

MECHANICAL LINKAGE

Filed June 27, 1968

Inventor

MAURICE BEAUVAIS

By Cushman, Darby + Cushman

Attorneys

United States Patent Office 3,523,460
Patented Aug. 11, 1970

3,523,460
MECHANICAL LINKAGE
Maurice Beauvais, Maisons-Alfort, France, assignor to Rhone-Poulenc S.A., Paris, France, a French body corporation
Filed June 27, 1968, Ser. No. 740,568
Claims priority, application France, June 30, 1967, 112,714
Int. Cl. F16h 21/44
U.S. Cl. 74—96                                    4 Claims

ABSTRACT OF THE DISCLOSURE

A mechanical linkage for controlling rotation of four elements such as plug valves. A drive shaft carries two drive pins for engagement in the forks of four connecting members of a Maltese linkage, and also carries a locking disc which engages cam surfaces on two of the connecting members to prevent rotation thereof, while the other two are rotated, and vice versa.

---

The present invention relates to a mechanical linkage for at least two rotary elements, through a limited angle and is particularly suitable for controlling rotary contacts and plug cocks.

Most operations which have to be carried out on fluid circuits require successive closing and opening of a plurality of valves or cocks in a specific order. These operations may be more of less long and tedious and often give rise to errors being committed on the part of the operators, the consequences of which may be serious and expensive.

To reduce this risk and simplify operation, several known means may be used such as multi-way plug cocks or decoupling of a plurality of plug cocks by levers and links, but these simple systems can solve the many problems only to a partial extent. The multi-way plug cocks are limited by the number of ways which can be provided, and also requiring a special cock for each machine design and thus, can be applied in practice only to simple cases (three-way or four-way cocks). The levers and links system may involve any number of cocks, but permits only simultaneous operations to be carried out and consequently does not make it possible, in most cases, to close a circuit before opening another, which in very many cases is unsuitable.

According to the present invention, there is provided a mechanical linkage for rotating at least two rotary elements through a limited angle, such apparatus comprising a drive shaft rotatable about its axis, a plurality of connecting members, one for each rotary element, drive means secured on said drive shaft adapted to engage at least one of said connecting elements for limited rotation thereof and locking means secured on said drive shaft adapted to engage the remainder of said connecting members, to prevent rotation thereof, during rotation of said at least one of said connecting members.

In a preferred construction, the apparatus comprises a drive shaft rotatable about its axis through an angle of 90° on either side of a median position; four connecting members each rotatable through 90° and disposed around said drive shaft in two pairs, the two connecting elements of each pair being disposed on diametrially opposite sides of said drive shaft axis; two forks on each of said connecting members extending radially outwardly from the associated connecting member axis of rotation, perpendicular to one another, with a concave cam surface on each connecting member between the forks; two drive pins secured on said drive shaft at a location to engage in a first pair of said forks for rotation thereof through 90°; and a locking disc secured on said drive shaft for rotation therewith and having a locking surface adapted to engage the concave cam surface on the other pair of said connecting members, the locking disc also having concave recesses at 90° to the locking surfaces, to accommodate the rotation of said first pair of forks.

The present invention makes it possible to operate a plurality of cocks or groups of cocks successively, all the closed cocks being put in this position and locked therein before the operation of opening the others has begun, and without a risk of incorrect operation, since control is effected by a single drive shaft, each position of which corresponds to a state of the circuits and may easily be marked.

In order that the invention may more readily be understood, the following description is given, merely by way of example, reference being made to the accompanying drawing, in which.

Figure 1:
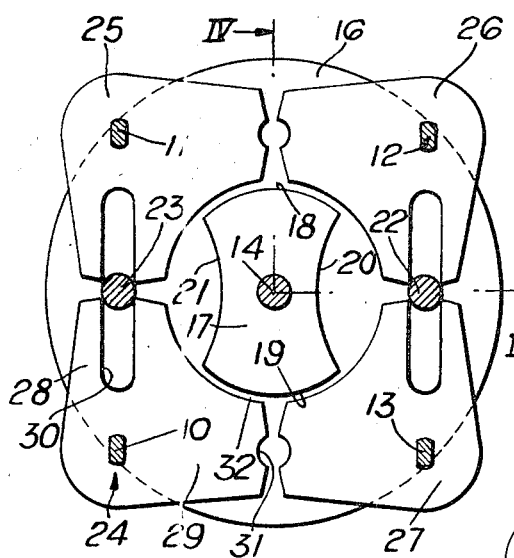
FIG. 1 is a top plan view, on the line I—I of FIG. 4, of one embodiment of linkage according to the invention, for the control of four plug cocks and shown in the median position, with the four cocks closed.
Figure 4:
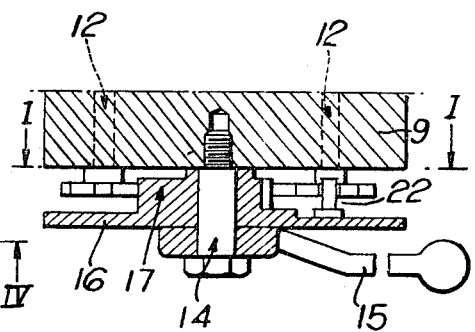
FIG. 4 is a sectional view of the line IV—IV of FIG. 1.

The linkage illustrated in FIGS. 1 to 4 includes a body 9 in which are rotatable the parallel spindles 10, 11, 12 and 13 of four rotary plug cocks (not shown). These spindles are symmetrically arranged around and parallel to a central drive shaft 14, which can be rotated by a control handle 15. Mounted on, and secured to, drive shaft 14 is a driving member 16 having integral therewith a locking disc 17, which is formed with two diametrally opposite locking surfaces 18 and 19, and at 90° thereto, two diametrally opposite arcuate recesses 20, 21. Also carried by the driving member are two drive pins 22, 23, which extend parallel to the axis of shaft 14 on diametrally opposite sides thereof.

Each of the spindles 10, 11, 12 and 13 carries an identical connecting member 24, 25, 26 and 27 respectively, arranged in mirror image relationship, each of the connecting members including a pair of forks 28, 29 extending radially outwardly from the spindle axis, and substantially perpendicular to one another. Fork 28 includes an elongate slot 30, while fork 29 is formed with an arcuate recess 31. Between the pairs of forks of each connecting member is formed a part circular cam surface 32, the radius of which is slightly larger than that of the locking surfaces 18 and 19.

The slots 30 cooperate with the pins 21, 22 in the manner of a Maltese-cross linkage.

In the median position of FIG. 1, the cam surfaces 32 are symmetrical relatively to the straight line connecting the two pins 21, 22, each pin then being situated at the junction of the slots 30 of two adjacent cams, the slots being orientated along the tangents to the circle described by the pins 21, 22 and the cam surfaces 32 forming a circle concentric with the drive shaft 14.

Figure 2:
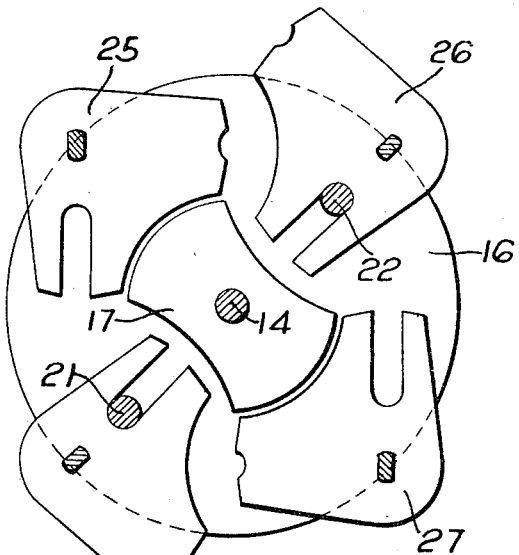
FIG. 2 is a similar view of the linkage of FIG. 1, having been rotated to an intermediate position.
Figure 3:
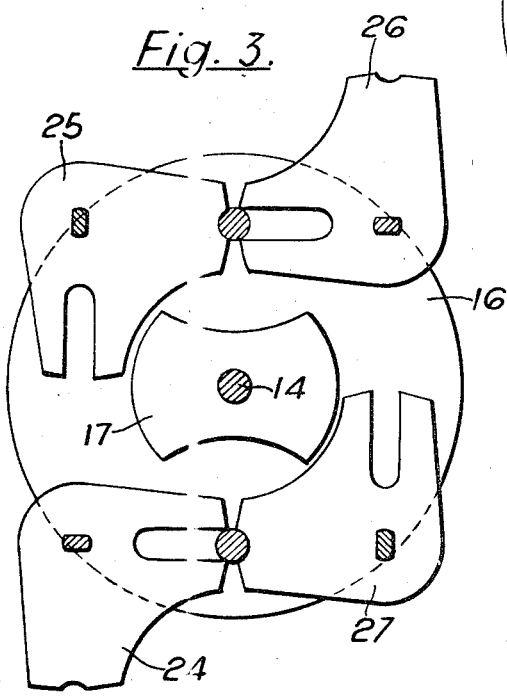
FIG. 3 is a similar view of the linkage rotated to the end of its travel.

The recesses 20, 21 are dimensioned to accommodate the ends of the forks 28 of two of the connecting members as the linkage rotates. During this rotation, the locking disc 17 is so positioned that the locking surfaces 18 and 19 cooperate with the cams 32 of two of the connecting members (25 and 27) which are not driven, preventing any undesirable rotational movement thereof. FIG. 2 shows two connecting members thus locked, the two other connecting members (24 and 26) having effected half of their rotational movement. In FIG. 3 the quarter-revolution is completed, and the pins abut in the recesses 31 of the non-driven connecting members, to complete the locking thereof.

Figure 5:
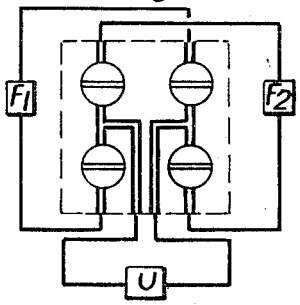
FIG. 5 is a schematic diagram of a fluid circuit controlled by the linkage of FIGS. 1 to 4.

FIG. 5 shows an example of the use of the linkage of FIGS. 1 to 4. Fluids F1 or F2 (such as hot and cold water) which are to remain separated from one another may flow through an apparatus U.

It will be seen that if there is a change from the position shown in FIG. 1 to the position shown in FIG. 3, the apparatus U will be put in communication with the circuit F1 and completely separated from circuit F2.

A linkage according to the invention can be constructed with many different constructional modifications which may be necessitated by the various conditions of use. For example the spindles 10 and 11 may be nearer to the shaft 14 than spindles 12 and 13 and conversely; the pins 21 and 22 or their mechanical equivalents would then have to be situated accordingly.

The spindles 10, 11, 12 and 13 need not necessarily be parallel, and for example they may be controlled by bevel gearing. The same shaft 14 may control the operation of a plurality of groups of rotary elements, for example three or four pairs of cocks mounted on the ends of one and the same assembly unit, their number only being limited by the total frictional forces.

I claim:

1. A mechanical linkage for rotating at least two rotary elements to a limited angle, said linkage comprising in combination:
   (a) a drive shaft rotatable about its axis through 90° on either side of a median position;
   (b) four connecting members each rotatable through 90° and disposed around said drive shaft in two pairs, the two connecting elements of each pair being on diametrally opposite sides of the drive shaft;
   (c) an axis of rotation for each of said connecting members, parallel to said drive shaft;
   (d) two forks on each of said connecting members extending radially outwardly from the connecting member axis of rotation perpendicular to one another, each fork having a radial slot which is orientable towards said drive shaft;
   (e) a concave cam surface defined on each connecting member, between said forks, said cam surface being concentric with said drive shaft when in said median position;
   (f) two drive pins secured on said drive shaft at a location to engage in a first pair of said forks for rotation thereof through 90°;
   (g) a locking disc secured on said drive shaft for rotation therewith;
   (h) locking surfaces on said locking disc effective to engage the concave cam surface on the other pair of said connecting members to prevent rotation thereof; and
   (i) two concave recesses in said locking discs at 90° to said locking surfaces, effective to accommodate the rotation of said first pair of forks.

2. The mechanical linkage as claimed in claim 1, wherein said connecting members are identical with one another and symmetrically arranged around the axis of said drive shaft in mirror image relationship.

3. The mechanical linkage as claimed in claim 2, wherein said connecting members are mounted for rotation about parallel axes.

4. A mechanical linkage for rotating at least two rotary elements to a limited angle, said linkage comprising, in combination:
   (a) a drive shaft rotatable about its axis through 90° on either side of a median position;
   (b) two connecting members each rotatable through 90° and disposed around said drive shaft at 90° with respect to one another and symmetrically arranged in mirror image relationship when in said median position;
   (c) an axis of rotation for each of said connecting members parallel to said drive shaft;
   (d) two forks on each of said connecting members extending radially outwardly from the connecting member axis of rotation perpendicular to one another, each fork having a radial slot which is orientable towards said drive shaft;
   (e) a concave cam surface defined on each connecting member, between said forks, said cam surface being concentric with said drive shaft when in said median position;
   (f) at least one pin secured on said drive shaft at a location to engage in the slot of one of said connecting members for rotation thereof through 90°;
   (g) a locking disc secured on said drive shaft for rotation therewith;
   (h) locking surfaces on said locking disc effective to engage the concave cam surface on the other of said connecting members to prevent rotation thereof; and
   (i) two concave recesses in said locking discs at 90° to said locking surfaces, effective to accommodate the rotation of said first pair of forks.

References Cited

UNITED STATES PATENTS 2,253,183   8/1941   Le Count.
2,409,300  10/1946  Miles _____ 74—436 X MILTON KAUFMAN, Primary Examiner U.S. Cl. X.R.

137—636; 251—249